US012268645B1

(12) United States Patent
Rebish

(10) Patent No.: US 12,268,645 B1
(45) Date of Patent: Apr. 8, 2025

(54) AGILITY, COORDINATION AND BALANCE TRAINING SYSTEM AND METHOD

(71) Applicant: Efrat Rebish, Northbrook, IL (US)

(72) Inventor: Efrat Rebish, Northbrook, IL (US)

( * ) Notice: Subject to any disclaimer, the term of this patent is extended or adjusted under 35 U.S.C. 154(b) by 0 days.

(21) Appl. No.: 18/965,613

(22) Filed: Dec. 2, 2024

(51) Int. Cl.
*A61H 1/00* (2006.01)

(52) U.S. Cl.
CPC .................................... *A61H 1/005* (2013.01)

(58) Field of Classification Search
CPC ................................ A61H 1/001; A61H 1/005
USPC .................................................. 434/247, 258
See application file for complete search history.

(56) References Cited

U.S. PATENT DOCUMENTS

| | | | | |
|---|---|---|---|---|
| 3,752,144 | A * | 8/1973 | Weigle, Jr. | A61B 5/1107 600/587 |
| 3,869,812 | A * | 3/1975 | Arakelian | A61B 5/16 434/258 |
| 4,034,980 | A | 7/1977 | Sniderman | |
| 4,111,418 | A * | 9/1978 | DeMent, Jr. | A63F 9/0093 273/287 |
| 4,299,389 | A | 11/1981 | Miolo | |
| 4,326,720 | A | 4/1982 | Erlich | |
| 5,040,800 | A | 8/1991 | Ulan | |
| 5,197,742 | A | 3/1993 | Bendit | |
| 5,209,486 | A | 5/1993 | Brotz | |
| 5,490,517 | A * | 2/1996 | Whitman | A61B 5/107 600/595 |
| 5,645,078 | A * | 7/1997 | Marmer | A63B 21/4035 600/595 |
| 5,839,991 | A * | 11/1998 | Hall | A63B 23/00 482/910 |
| 7,993,253 | B2 | 8/2011 | Fernandez | |
| 8,118,306 | B2 * | 2/2012 | Kean | A63F 3/00694 273/288 |
| 8,678,829 | B2 * | 3/2014 | Manfre | A63B 17/00 434/258 |
| 9,272,172 | B2 * | 3/2016 | Choppla | G09B 19/06 |
| 9,415,287 | B2 * | 8/2016 | Greiwe | A63B 21/4035 |
| 9,630,053 | B2 | 4/2017 | Kolvenbach et al. | |
| 10,188,906 | B2 * | 1/2019 | Haas | A63B 17/04 |
| 2006/0134589 | A1 * | 6/2006 | Goodwin | G09B 23/28 434/259 |
| 2009/0243214 | A1 | 10/2009 | Kean | |
| 2015/0050629 | A1 * | 2/2015 | Pease | A63B 63/00 434/247 |
| 2019/0176021 | A1 | 6/2019 | Roehrig | |

FOREIGN PATENT DOCUMENTS

| | | | |
|---|---|---|---|
| CN | 105833521 | A1 | 8/2016 |
| CN | 108905080 | B | 11/2018 |
| CN | 216535843 | U | 5/2022 |
| CN | 115054873 | A | 9/2022 |
| WO | 1998039073 | A1 | 9/1998 |
| WO | 2021052550 | A1 | 3/2021 |

* cited by examiner

*Primary Examiner* — Kurt Fernstrom
(74) *Attorney, Agent, or Firm* — LESLEY A. WALLERSTEIN, LLC

(57) ABSTRACT

A patient in need stands on a vibrating platform set against a wall. Following a prescribed sequence and pattern, while the platform vibrates, the patient uses one hand to remove one checker at a time off its storage hook and place the checker onto a magnetic square on the opposite side of the checkerboard, all while keeping his other hand free of the platform and free of the wall.

4 Claims, 9 Drawing Sheets

AGILITY, COORDINATION AND BALANCE TRAINING SYSTEM AND METHOD

REFERENCE TO RELATED APPLICATIONS

Not Applicable.

STATEMENT OF GOVERNMENT INTEREST

Not Applicable.

JOINT RESEARCH AGREEMENT

Not Applicable.

BACKGROUND OF THE INVENTION

This invention is directed to a system and method of improving agility, hand-eye coordination and balance in a patient in need. Hand-eye coordination, balance, and agility are essential physical skills that play a crucial role in our daily activities, sports, and overall physical performance. Hand-eye coordination refers to the ability to synchronize visual input with hand movements. This skill is vital for tasks that require precise control, such as writing, typing, or playing sports like basketball and tennis. It involves a complex interplay between the eyes, motor neurons and muscles. The brain processes incoming visual information to direct hand movements. This coordination develops and strengthens through practice and experience, beginning in childhood and improving as individuals engage in various physical activities.

Balance, another critical aspect of physical performance, refers to the ability to maintain a stable and controlled body position, whether stationary or in motion. It relies on sensory information from the inner ear, eyes, and proprioceptors (sensors in the muscles and joints) to keep the body oriented. Good balance is essential for everyday tasks, such as walking, climbing stairs, or standing on one leg. In sports, athletes often require exceptional balance to perform maneuvers effectively, whether it's a gymnast executing a routine or a soccer player dribbling the ball. Training and exercises that challenge balance, can significantly enhance this skill.

Agility encompasses the ability to change direction quickly and efficiently while maintaining control over one's body. It combines elements of speed, coordination, and balance, allowing individuals to respond swiftly to dynamic environments. Athletes in sports such as soccer, basketball, and rugby rely heavily on agility to outmaneuver opponents and navigate through complex play scenarios. Agility training often includes drills that promote quick footwork, lateral movements, and reaction time, helping to improve overall athletic performance.

The relationship between these three skills is intricate; they often enhance each other. For example, strong hand-eye coordination can improve an individual's agility by allowing for better control during rapid movements. Similarly, good balance supports agility by enabling individuals to make quick direction changes without losing stability. Training in one area can often lead to improvements in the others, highlighting the importance of a holistic approach to physical fitness.

Agility, hand-eye coordination and balance are foundational skills that contribute to effective movement and performance in various aspects of life. While each skill has its distinct features and training methods, their interdependence underscores the importance of developing a wellrounded physical capability. Engaging in diverse physical activities, sports, and specific training exercises can foster these skills, ultimately leading to improved performance throughout daily life.

SUMMARY OF THE INVENTION

A patient in need stands on a vibrating platform set against a wall. A checkerboard hangs on the wall centered above the platform and further positioned above the level of the patient's shoulder. We divide this checkerboard into a right and a left half. We frame the checkerboard with two borders. Mounted to the outermost border of the checkerboard are four spaced-apart storage hooks. We hang magnetic checkers on each of these four storage hooks. Following a prescribed pattern, while the platform vibrates, the patient uses one hand to remove one checker at a time off its storage hook and onto a magnetic square on the opposite side of the checkerboard, all while keeping his other hand free of the platform and free of the wall.

In one embodiment, the patient stands with both feet on the platform. While the platform vibrates, he raises his right hand to pick up a magnetic checker from the rightmost hook and places it on one of the leftmost magnetic squares on the checkerboard, keeping his left hand in the air. He repeats the exercise with his left hand, raising his left hand to grab a magnetic checker from the leftmost hook and placing it on one of the rightmost magnetic squares, all while the platform continues to vibrate and all while keeping his right hand free. To make the exercise even more challenging, we repeat the sequence with the patient standing on the vibrating platform with only one leg.

REFERENCE NUMERALS

1 Agility, coordination, and balance training system
10 Vibrating platform
20 Checkerboard
30 Magnetized square
40 Vertical centerline
50 Leftmost storage hook
60 Rightmost storage hook
70 Center left storage hook
80 Center right storage hook
90 Leftmost group of magnetic checkers
100 Rightmost group of magnetic checkers
110 Center left group of magnetic checkers
120 Center right group of magnetic checkers

DETAILED DESCRIPTION OF THE INVENTION

Figure 1:
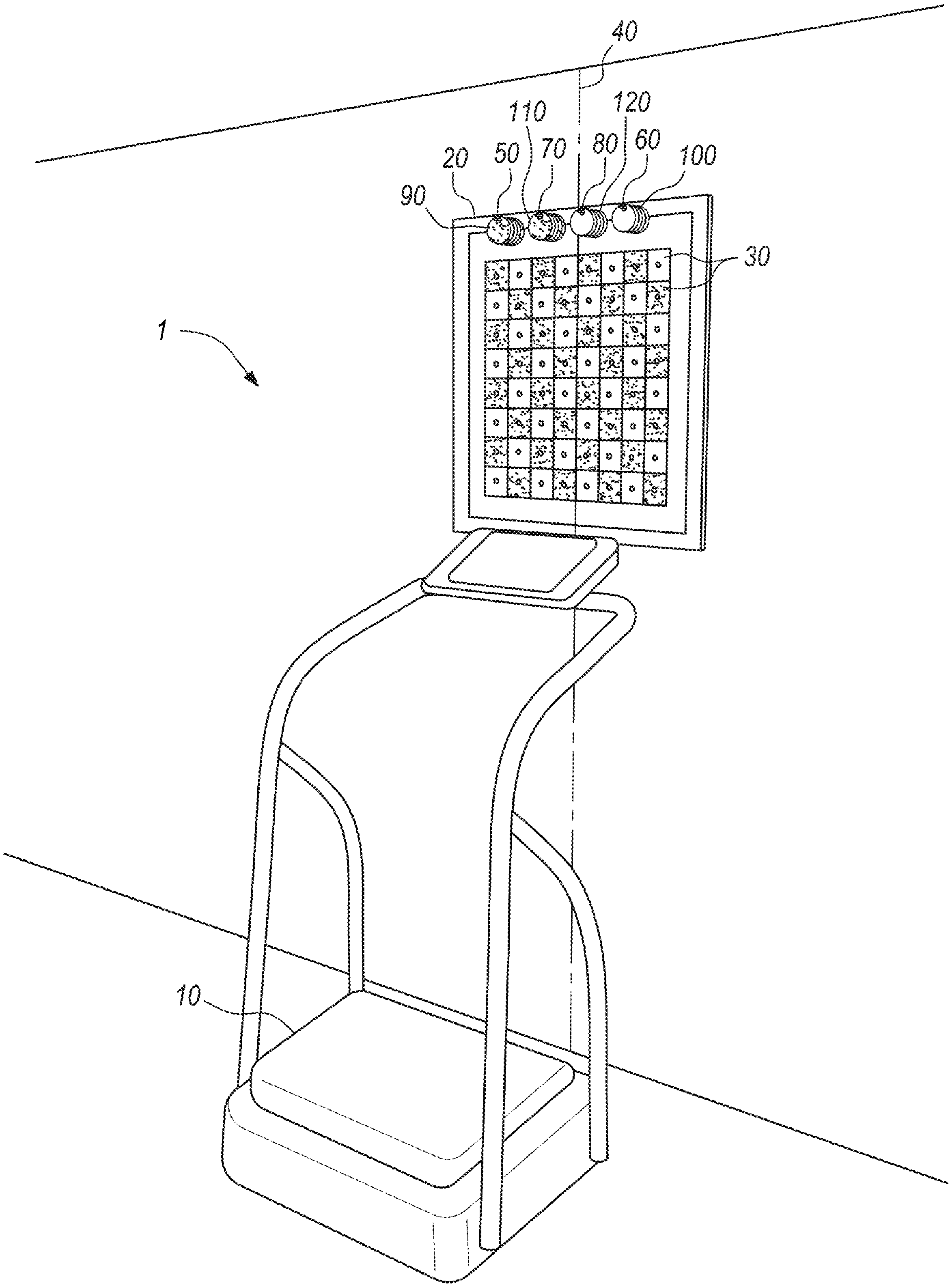
FIG. 1 is a front perspective view of an agility, coordination, and balance training system, shown with the platform not vibrating and without a person using it.

FIG. 1 shows the agility, coordination, and balance training system 1 subject of this application. The system comprises two main parts: a vibrating platform 10 positioned against and facing a wall and underneath a checkerboard 20 hanging on the wall. The platform 10 shown in the illustration is a Zaaz® brand whole-body vibration machine. The Zaaz® has handles and a programmable console. The handles and console are not numbered because the system and method described here do not require those parts. For convenience we refer to this machine as the platform whether or not it has handles or console. The person using the system does not touch the handles and, other than turning on the platform, does not touch the console. Other brands and types of vibrating platforms, with or without handles or consoles, may be used.

Checkerboard 20 hangs on a wall above and facing the platform. The checkerboard can be made of any material that can independently retain its shape and size when hung on a wall: wood, metal, plastic, textile or composite, woven or knit. Preferably, checkerboard 20 is divided into 8 rows and 8 columns of 64 magnetized squares 30. Most preferably, checkerboard 20 is 28 inches square. An inner border, not numbered, surrounds the checkerboard. An outer border, not numbered, surrounds the inner border. Preferably the checkerboard, plus inner and outer borders measure 30 inches square. Checkerboard 20 can be any even-numbered row and column configurations, such as 6 rows×6 columns, 4 rows by 4 columns, 10 rows by 10 columns and so on. The squares are shaded in two contrasting colors. The colors do not matter and need not even match the checkers. In the example shown, and for simplicity and clarity, the checkerboard is illustrated with alternating white and shaded squares. The magnets are attached centered on the front surface of each square. An imaginary vertical centerline 40 divides checkerboard 20 into a left half and a right half. Vibrating platform 10 also has a center along the side placed against the wall, not shown. The center of the vibrating platform directly aligns with vertical centerline 40.

Evenly spaced along the outer border of the checkerboard, we attach 4 storage hooks. From left to right, these are: leftmost storage hook 50, center left storage hook 70, center right storage hook 80 and rightmost storage hook 60. These hooks are made from any rigid material such as plastic, metal or wood. Preferably the storage hooks are wood. Each storage hook must be long enough to hold at least 6 checkers. Preferably the storage hooks are at least 4 inches long and ½ inch thick, but other dimensions work equally well as long as they can stay attached to the outer border of the checkerboard and support the checkers.

The system requires at least 8 magnetic checkers of each of two contrasting colors, for a total of at least 16 magnetic checkers. Preferably, and as shown in these illustrations, the checkers are circles 3 inches across and ¼ inch thick. Other dimensions and shapes of checkers can work equally well with this system and method. The checkers can be oval, or they can even be square. The illustrations show the two contrasting colors as white and shaded. Each checker has a magnet attached to its center back.

Each checker further has a hole drilled through and above the magnet, this hole being larger than the storage hooks are thick. For convenience, we identify the at least 8 magnetic checkers of each contrasting color as follows: a leftmost group of 4 magnetic checkers 90 hung on the leftmost storage hook 50, a center left group of 4 magnetic checkers 110 hung on the center left storage hook 70, a center right group of 4 magnetic checkers 120 hung on the center right storage hook 80, and a rightmost group of 4 magnetic checkers 100 hung on the rightmost storage hook 60. Checkers groups 90 and 110 are shaded. Checkers groups 100 and 120 are white.

Figure 2:
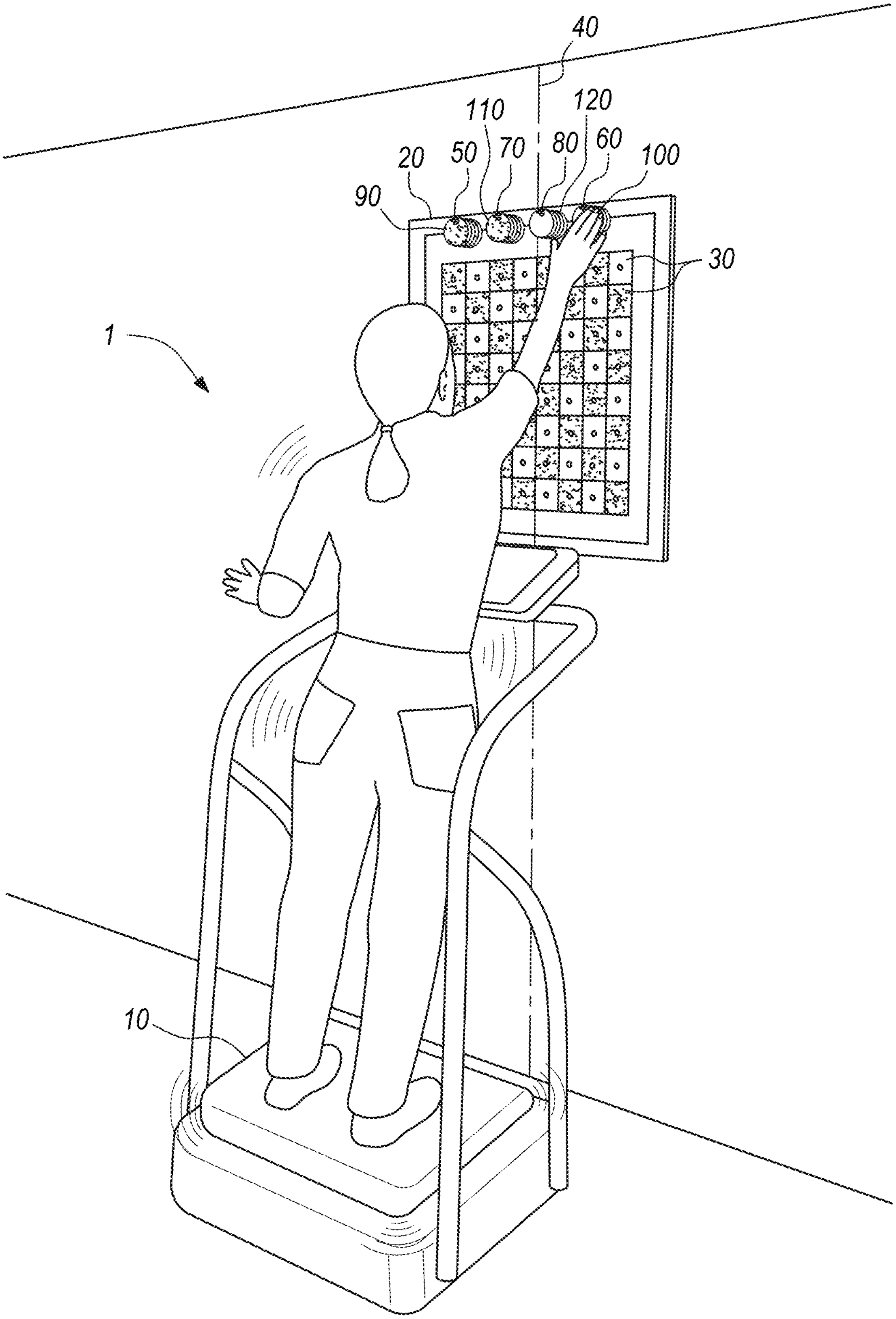
FIG. 2 is a front perspective view thereof, shown with the platform vibrating and with a person standing on both feet reaching for a checker on the rightmost storage hook.

FIGS. 2-5 show the sequence and method of training a person's agility, coordination and balance, as performed with two feet on the platform. This is the easier of the two sequences. FIG. 2 shows a person standing on a vibrating platform. The particular platform illustrated has handles but the person will not be touching or using the handles. Her elbow is shown above the handle, not using the handles for support. The training method requires the person to only touch the checkers and the checkerboard and not rely on any handle or arm rest. With both feet on the vibrating platform, the vibrations spread upward to her upper body and arms. While vibrating, she engages her core abdominal muscles and sense of balance to remain standing while raising her right arm above her head and grabbing the first of the rightmost group of magnetic checkers 100.

Figure 3:
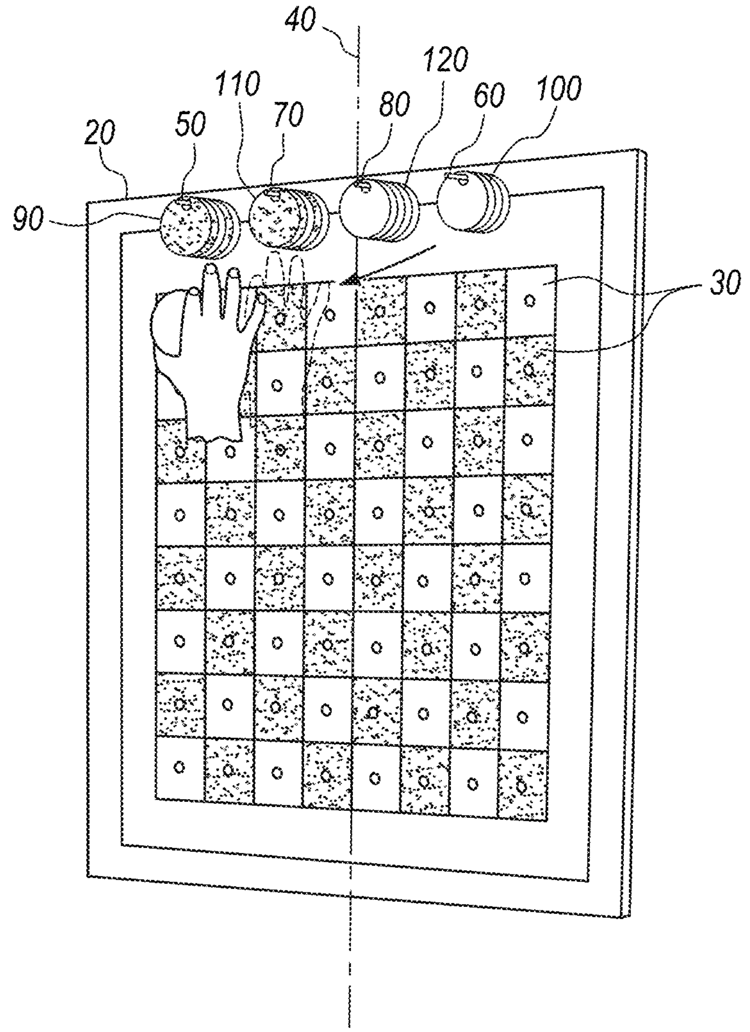
FIG. 3 is a close-up view thereof, showing the direction the person moves the checker.
Figure 4:
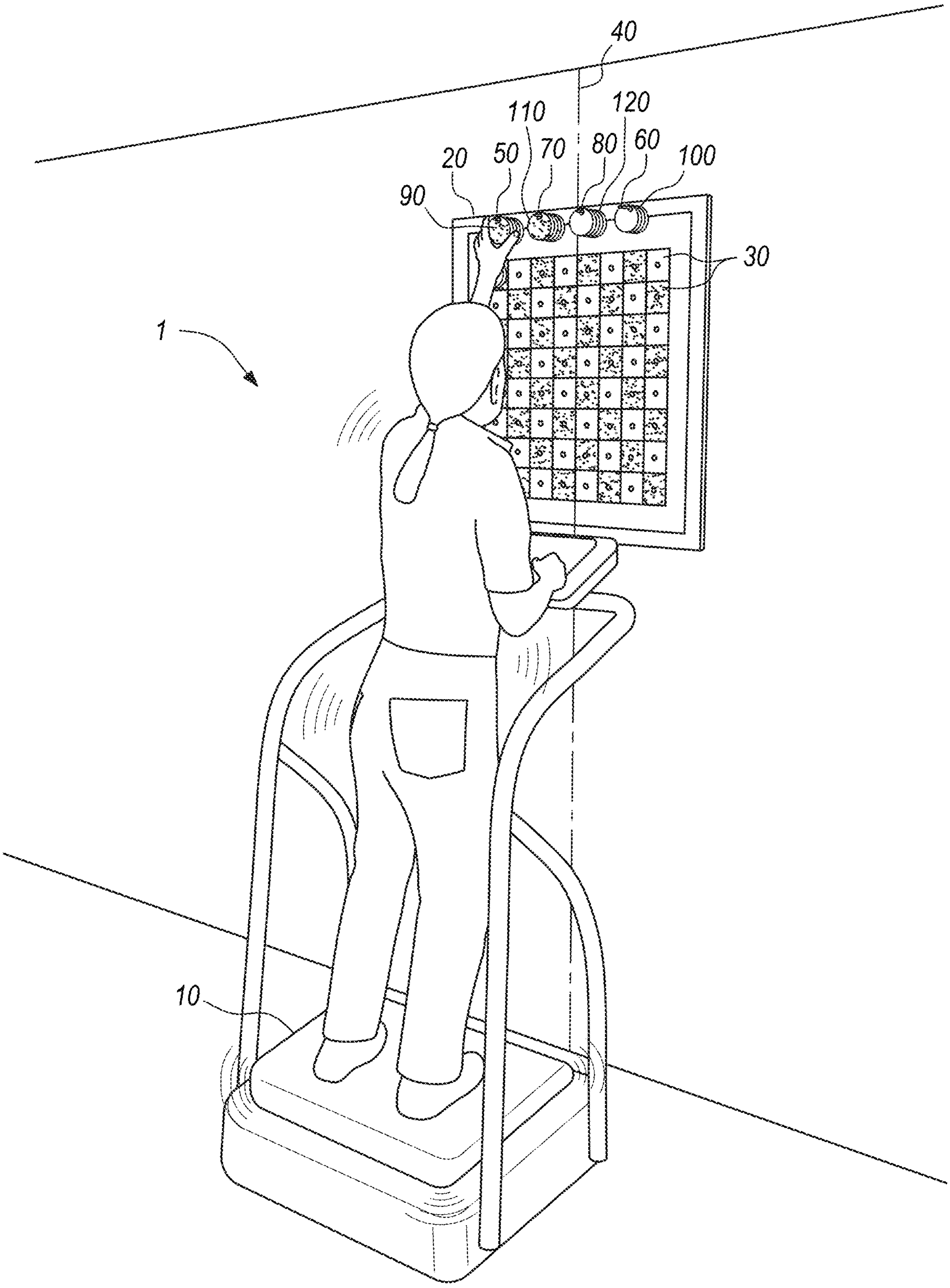
FIG. 4 is a front perspective view of the agility, coordination and balance training system shown vibrating and with a person standing on both feet reaching for a checker on the leftmost storage hook.
Figure 5:
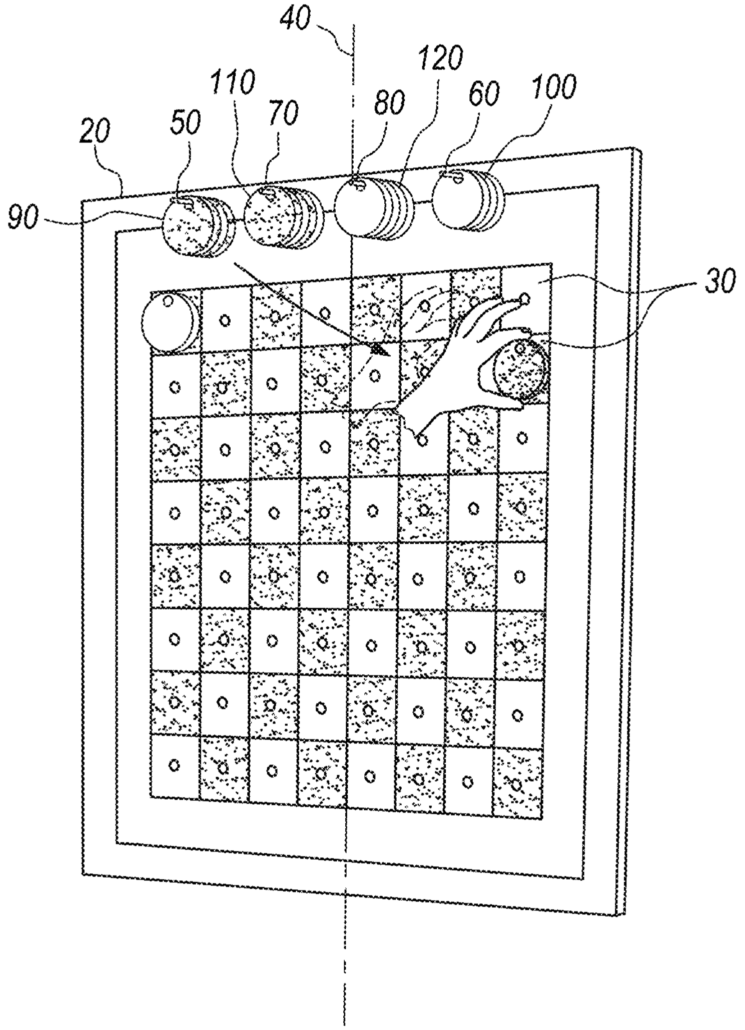
FIG. 5 is a close-up view thereof, showing the direction the person moves the checker.

FIG. 3 shows the direction in which the person moves the magnetic checker across the vertical centerline 40 and onto a magnetized square on the left half of the checkerboard. For convenience and clarity, we did not illustrate the person's head and body. FIG. 4 shows the person grabbing the first of the leftmost group of magnetic checkers 90. FIG. 5 shows the direction in which she moves the magnetic checker across the vertical centerline 40 and places it onto a magnetized square on the right half of the checkerboard. The person repeats these two alternating steps: grabbing a checker with the right hand, placing it onto the left half of the checkerboard, then grabbing another checker with the left hand and placing it onto the right half of the checkerboard. She repeats these two steps until she has moved all the checkers hanging on the rightmost storage hook 60 to the left half of the checkerboard and moved all the checkers hanging on the leftmost storage hook 50 to the right half of the checkerboard. The illustrations show 4 checkers on each of the storage hooks 50, 60, 70 and 80. Other numbers of checkers can be used.

Figure 6:
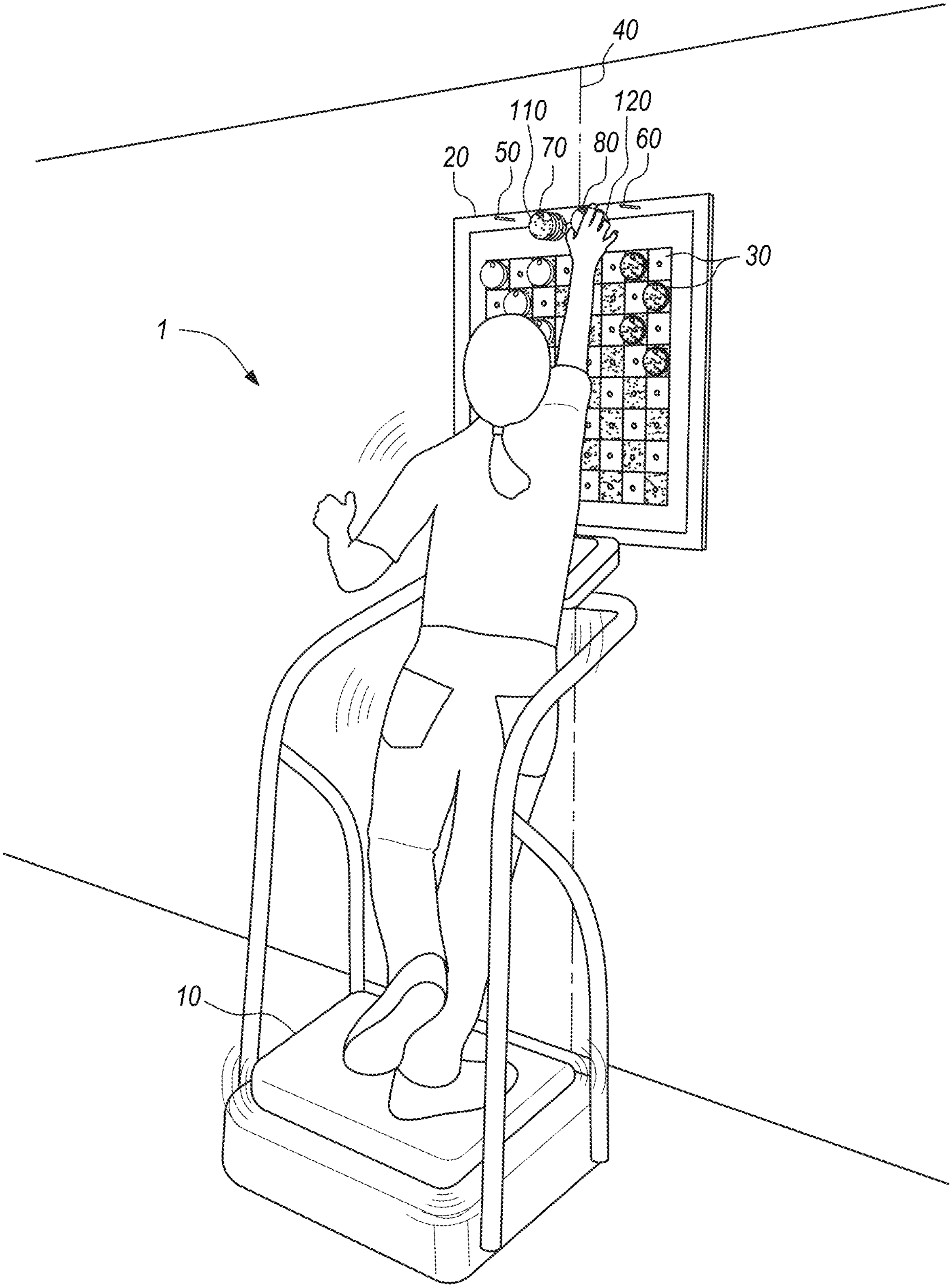
FIG. 6 is a front perspective view of the agility, coordination and balance training system shown vibrating and with a person standing on her right foot reaching for a checker on the right center storage hook.
Figure 7:
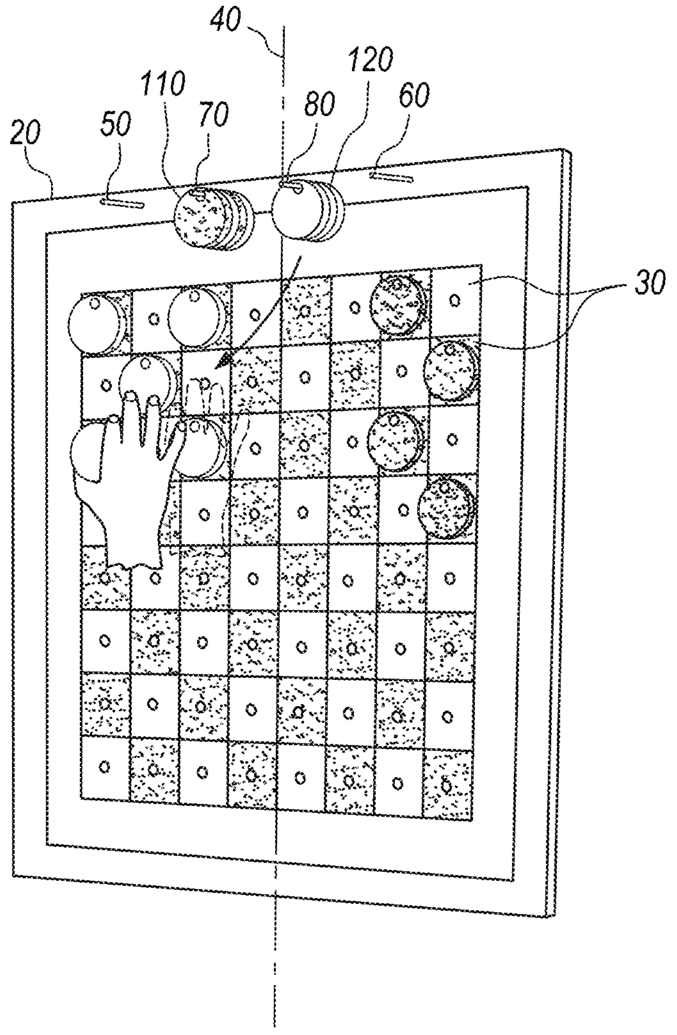
FIG. 7 is a close-up view thereof, showing the direction the person moves the checker.
Figure 8:
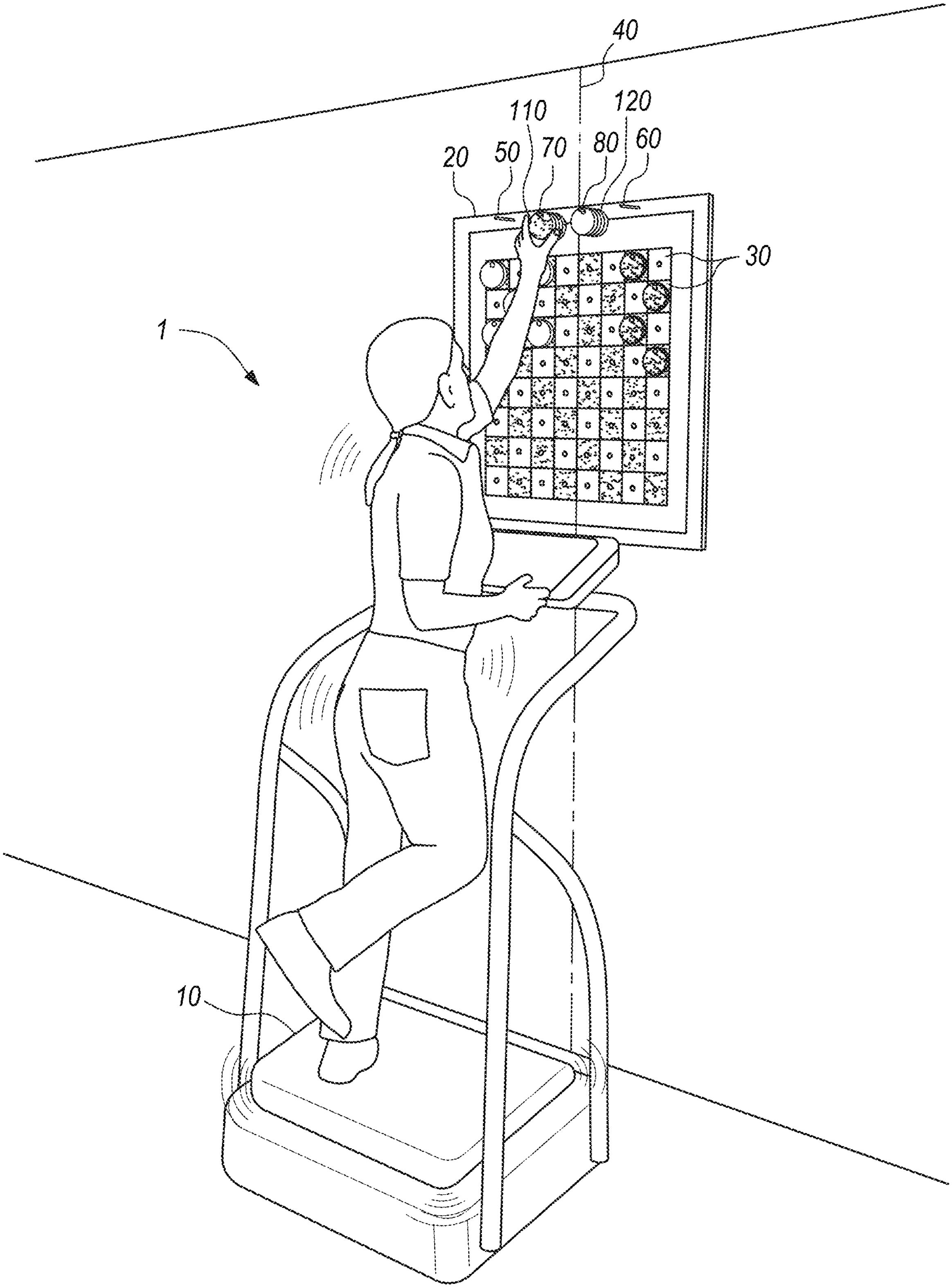
FIG. 8 is a front perspective view of the agility, coordination and balance training system, shown vibrating and with a person standing on her left foot reaching for a checker on the left center storage hook.
Figure 9:
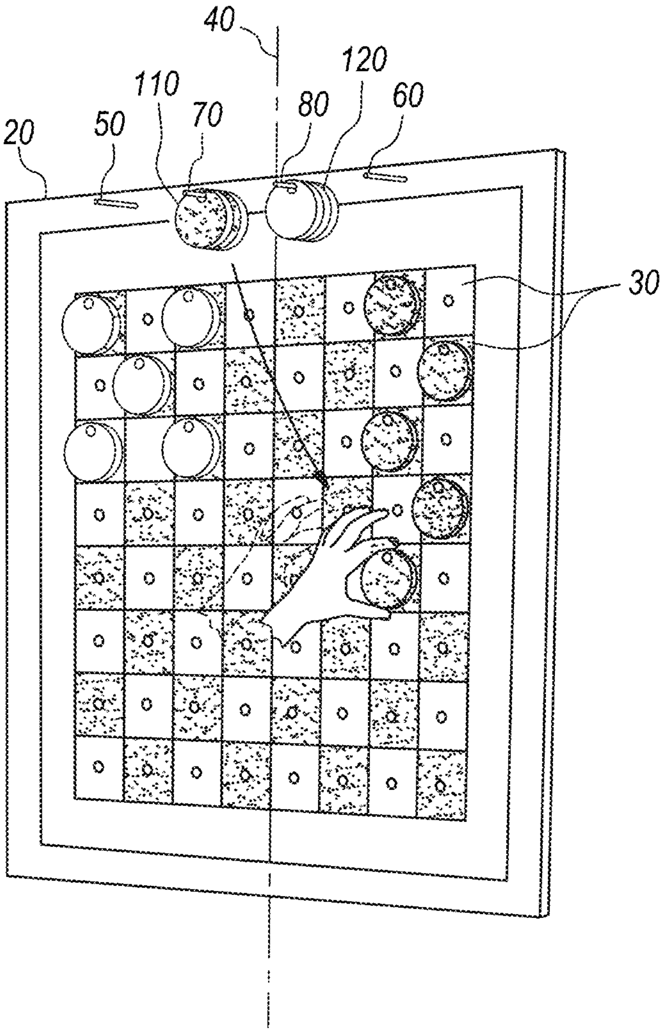
FIG. 9 is a close-up view thereof, showing the direction the person moves the checker.

FIGS. 6-9 show a more challenging variation of the basic exercise, performed standing on only one foot. FIG. 6 shows the person grabbing the first checker from the center right group of magnetic checkers 120, while platform 10 continues to vibrate and she is balancing on her right foot. While continuing to balance on her right foot, FIG. 7 shows her placing the checker on a free magnetized square on the left half of the checkerboard. At this point, she does not alternate feet and hands. This being a more challenging exercise, she remains on her right foot and again uses her right hand to grab the next checker from the center right group of magnetic checkers 120. She moves this next checker to a yet other free magnetized square on the left half of the checkerboard. She repeats this exercise balancing on her right foot and using her right hand, until she moves all checkers from the center right group of magnetic checkers 120 to a free magnetized square on the left half of the checkerboard. This activity forces the person to find their center of gravity, their center of mass, hold still those body parts not needed for the exercise and consciously think about where to place the checker, all while maintaining balance on the same one foot.

Once the person moves all the checkers from the center right group of magnetic checkers 120 to the left half of the checkerboard, she places her left foot down and raises her right foot. Please see FIG. 8. She repeats this exercise in mirror image, moving checkers one at a time from the center left group of magnetic checkers 110 across the vertical centerline 40 to a free magnetized square on the right half of the checkerboard, until all checkers from group 110 have been moved to a free magnetized square on the right half of the checkerboard.

Although embodiments and examples of the invention have been shown and described, it is to be understood that various modifications, substitutions, and rearrangements of parts, components, steps, as well as other uses, shapes, construction, and design of this system can be made by those skilled in the art without departing from the novel spirit and scope of this invention.

I claim:

1. A method of treating agility, coordination and balance disorders in a patient in need, comprising the steps of:
- a. placing a vibrating platform against and at the base of a wall;
- b. standing on the vibrating platform;
- c. hanging on the wall and centering above the platform a square checkerboard subdivided into rows and columns of smaller and magnetized squares, the checkerboard further having a vertical centerline dividing the checkerboard into a left half and a right half;
- d. hanging a first group of magnetic checkers on a leftmost storage hook;
- e. hanging a second group of magnetic checkers on a rightmost storage hook;
- f. while the platform vibrates, grabbing with the right hand one of the second group of magnetic checkers hanging on the rightmost storage hook and moving it on a magnetized square on the left half of the checkerboard;
- g. while the platform vibrates, grabbing with the left hand one of the first group of magnetic checkers hanging on the leftmost storage hook and moving it on a free magnetized square on the right half of the checkerboard; and
- h. repeating steps e and f in order until all checkers have been moved from the leftmost storage hook onto a free magnetized square on the right half of the checkerboard and all checkers have been removed from the rightmost storage hook onto a free magnetized square on the left half of the checkerboard.

2. The method of claim 1, comprising the further steps of:
- a. hanging a third group of magnetic checkers on a left center storage hook;
- b. hanging a fourth group of magnetic checkers on a right center storage hook;
- c. while the platform vibrates, lifting the left foot off the platform, grabbing with the right hand one of the third group of magnetic checkers hanging on the right center storage hook and moving it onto a free magnetized square on the left half of the checkerboard;
- d. while the platform continues to vibrate, returning the left foot back onto the platform, lifting the right foot off the platform, grabbing with the left hand one of the fourth group of magnetic checkers hanging on the left center storage hook and moving it onto a free magnetized square on the right half of the checkerboard;
- e. repeating steps c and d in order until all checkers have been moved from the left center storage hook onto a free magnetized square on the right half of the checkerboard and from the right center storage hook and onto a free magnetized square on the left half of the checkerboard.

3. A system for treating agility, coordination and balance disorders in a human, comprising:
- a. a wall having a base;
- b. a vibrating platform placed against and at the base of the wall;
- c. a square checkerboard subdivided into rows and columns of smaller squares and hung on the wall centered above the vibrating platform;
- d. an inner border surrounding the checkerboard;
- e. an outer border surrounding the inner border;
- f. a magnet attached to a front surface of each of the smaller squares;
- g. a vertical centerline dividing the checkerboard into a left half and a right half;
- h. a leftmost storage hook attached to a top left edge of the outer border;
- i. a rightmost storage hook attached to a top right edge of the outer border;
- j. a first group of magnetic checkers having a hanging hole dimensioned larger than the diameter of the leftmost storage hook; and
- k. a second group of magnetic checkers having a hanging hole dimensioned larger than the diameter of the rightmost storage hook.

4. The system of claim 3, further comprising:
- a. a left center storage hook attached to a top left center edge of the outer border;
- b. a right center storage hook attached to a top right center edge of the outer border;
- c. a third group of magnetic checkers having a hanging hole dimensioned larger than the diameter of the left center storage hook; and
- d. a fourth group of magnetic checkers having a hanging hole dimensioned larger than the diameter of the right center storage hook.

* * * * *